(12) United States Patent
Orler et al.

(10) Patent No.: US 7,545,319 B2
(45) Date of Patent: Jun. 9, 2009

(54) CONFIGURABLE SATELLITE POSITIONING SYSTEM RECEIVERS WITH PROGRAMMABLE INPUTS

(75) Inventors: Anthony James Orler, Torrance, CA (US); Keith Jacob Brodie, Irvine, CA (US); Charles P. Norman, Huntington Beach, CA (US)

(73) Assignee: SiRF Technology, Inc., San Jose, CA (US)

( * ) Notice: Subject to any disclaimer, the term of this patent is extended or adjusted under 35 U.S.C. 154(b) by 109 days.

(21) Appl. No.: 10/518,621

(22) PCT Filed: Jun. 18, 2003
(Under 37 CFR 1.47)

(86) PCT No.: PCT/US03/19363

§ 371 (c)(1),
(2), (4) Date: Oct. 25, 2005

(87) PCT Pub. No.: WO04/001439

PCT Pub. Date: Dec. 31, 2003

(65) Prior Publication Data

US 2006/0279456 A1    Dec. 14, 2006

(51) Int. Cl.
H04B 7/185 (2006.01)
(52) U.S. Cl. .............. 342/357.12; 342/357.06
(58) Field of Classification Search .......... 342/352, 342/357.01, 357.02, 357.06, 357.12, 357.15; 701/213, 215
See application file for complete search history.

(56) References Cited

U.S. PATENT DOCUMENTS

| | | | |
|---|---|---|---|
| 4,445,118 A | 4/1984 | Taylor et al. | 343/357 |
| 4,800,577 A | 1/1989 | Tachita et al. | 375/115 |
| 5,410,750 A | 4/1995 | Cantwell et al. | |
| 5,504,684 A | 4/1996 | Lau et al. | 364/443 |
| 5,519,403 A | 5/1996 | Bickley et al. | 342/352 |
| 5,663,734 A | 9/1997 | Krasner | |

(Continued)

OTHER PUBLICATIONS

New Fast GPS Code-Acquisition Using FFT, Electronic Letters, vol. 27, No. 2, pp. 159-160 (1991).

(Continued)

*Primary Examiner*—Dao L Phan
(74) *Attorney, Agent, or Firm*—The Eclipse Group LLP

(57) ABSTRACT

Generic SATPS receivers and methods for configuring generic SATPS receivers that include a plurality of outputs are provided. These configurable SATPS receivers are adapted to be utilized in at least one of a plurality of particular SATPS receiver applications, and can also include a plurality of input paths, and a means for generating selected ones of the plurality of possible outputs. Selected ones of the plurality of outputs are enabled/disabled based on at least one requirement of the particular receiver application to configure or program the generic SATPS receiver to function as a SATPS receiver used for a particular SATPS receiver application or operating environment. The selected ones of the plurality of outputs can be defined by and can be those utilized by the particular SATPS receiver application or operating environment. Thus, SATPS receivers are provided that can be used in multiple applications, that can accept multiple types of assistance data, and that have multiple types of outputs depending on the application and/or desires of the user. The SATPS receiver can be implemented in SATPS systems that include at least one satellite that provides SATPS information, a generic SATPS receiver, and a remote computer.

20 Claims, 5 Drawing Sheets

U.S. PATENT DOCUMENTS

| | | | |
|---|---|---|---|
| 5,663,735 | A | 9/1997 | Eshenbach |
| 5,748,651 | A | 5/1998 | Sheynblat ................... 371/49.1 |
| 5,781,156 | A | 7/1998 | Krasner |
| 5,796,773 | A | 8/1998 | Sheynblat ................... 375/200 |
| 5,812,087 | A | 9/1998 | Krasner |
| 5,825,327 | A | 10/1998 | Krasner |
| 5,831,574 | A | 11/1998 | Krasner |
| 5,841,396 | A | 11/1998 | Krasner |
| 5,861,842 | A | 1/1999 | Hitch et al. ................... 342/357 |
| 5,874,914 | A | 2/1999 | Krasner ....................... 342/357 |
| 5,884,214 | A | 3/1999 | Krasner |
| 5,945,944 | A | 8/1999 | Krasner |
| 5,999,124 | A | 12/1999 | Sheynblat |
| 6,002,363 | A | 12/1999 | Krasner |
| 6,009,551 | A | 12/1999 | Sheynblat ................... 714/776 |
| 6,016,119 | A | 1/2000 | Krasner |
| 6,041,222 | A | 3/2000 | Horton et al. ................ 455/255 |
| 6,052,081 | A | 4/2000 | Krasner |
| 6,061,018 | A | 5/2000 | Sheynblat |
| 6,064,336 | A | 5/2000 | Krasner |
| 6,097,974 | A | 8/2000 | Camp, Jr. et al. ............. 455/575 |
| 6,104,338 | A | 8/2000 | Krasner |
| 6,104,340 | A | 8/2000 | Krasner |
| 6,107,960 | A | 8/2000 | Krasner |
| 6,111,540 | A | 8/2000 | Krasner |
| 6,131,067 | A | 10/2000 | Girerd |
| 6,133,871 | A | 10/2000 | Krasner |
| 6,133,873 | A | 10/2000 | Krasner |
| 6,133,874 | A | 10/2000 | Krasner |
| 6,150,980 | A | 11/2000 | Krasner |
| 6,185,427 | B1 | 2/2001 | Krasner |
| 6,208,290 | B1 | 3/2001 | Krasner |
| 6,208,291 | B1 | 3/2001 | Krasner |
| 6,215,441 | B1 | 4/2001 | Moeglein |
| 6,215,442 | B1 | 4/2001 | Sheynblat |
| 6,236,354 | B1 | 5/2001 | Krasner |
| 6,239,742 | B1 | 5/2001 | Krasner |
| 6,259,399 | B1 | 7/2001 | Krasner |
| 6,272,430 | B1 | 8/2001 | Krasner |
| 6,282,412 | B1 | 8/2001 | Lyons ....................... 455/186.1 |
| 6,289,041 | B1 | 9/2001 | Krasner |
| 6,295,023 | B1 | 9/2001 | Bloebaum .............. 342/357.06 |
| RE37,408 | E | 10/2001 | Loomis et al. ......... 342/357.12 |
| 6,298,221 | B1 | 10/2001 | Nguyen ........................ 455/73 |
| 6,307,504 | B1 | 10/2001 | Sheynblat |
| 6,313,786 | B1 | 11/2001 | Sheynblat |
| 6,314,308 | B1 | 11/2001 | Sheynblat |
| 6,324,160 | B1 | 11/2001 | Martin et al. ............... 370/209 |
| 6,351,236 | B1 | 2/2002 | Hasler ................... 342/357.09 |
| 6,356,749 | B1 | 3/2002 | Rollins et al. ............... 455/334 |
| 6,369,753 | B1 | 4/2002 | Schucker et al. ....... 342/357.12 |
| 6,377,209 | B1 | 4/2002 | Krasner |
| 6,389,291 | B1 | 5/2002 | Pande et al. .................. 455/456 |
| 6,400,314 | B1 | 6/2002 | Krasner |
| 6,408,196 | B2 | 6/2002 | Sheynblat |
| 6,411,254 | B1 | 6/2002 | Moeglein |
| 6,411,892 | B1 | 6/2002 | Van Diggelen |
| 6,417,801 | B1 | 7/2002 | Van Diggelen |
| 6,421,002 | B2 | 7/2002 | Krasner |
| 6,429,814 | B1 | 8/2002 | Van Diggelen et al. |
| 6,433,731 | B1 | 8/2002 | Sheynblat |
| 6,433,734 | B1 | 8/2002 | Krasner |
| 6,453,237 | B1 | 9/2002 | Fuchs et al. |
| 6,484,097 | B2 | 11/2002 | Fuchs et al. |
| 6,487,499 | B1 | 11/2002 | Fuchs et al. |
| 6,510,387 | B2 | 1/2003 | Fuchs et al. |
| 6,518,919 | B1 | 2/2003 | Durst et al. ............. 342/357.07 |
| 6,519,466 | B2 | 2/2003 | Pande et al. |
| 6,542,821 | B2 | 4/2003 | Krasner |
| 6,542,823 | B2 | 4/2003 | Garin et al. |
| 6,583,757 | B2 | 6/2003 | Krasner |
| 6,597,311 | B2 | 7/2003 | Sheynblat |
| 6,633,255 | B2 | 10/2003 | Krasner |
| 6,738,013 | B2 * | 5/2004 | Orler et al. .............. 342/357.06 |
| 6,747,596 | B2 * | 6/2004 | Orler et al. .............. 342/357.06 |
| 7,151,485 | B2 * | 12/2006 | Orler et al. .............. 342/357.06 |
| 2002/0183074 | A1 | 12/2002 | Delaveau et al. |
| 2003/0069036 | A1 | 4/2003 | Forrester ...................... 455/552 |

OTHER PUBLICATIONS

Novel Fast GPS/GLONASS Code Acquisition Technique Using Low Update Rate FFT, Electronic Letters, vol. 28, No. 9, pp. 863-865 (1992).

Marketing Material: Qualcomm CDMA Technologies - Integrated Solutions —MGP6200™ Multimode GPS Processor (8 pages); Jun. 27, 2002.

Marketing Material: uNav Microelectronics - uN9x18 Low Power, High Performance GPS Receiver Chipset/uN9x18 GPS Receiver Solution (9 pages); Jun. 23, 2006.

Marketing Material: uNav Microelectronics, uN9x18 Low Power, High Performance GPS Receiver Chipset (2 pages); Jul. 21, 2006.

Marketing Material: Global Locate -- Hammerhead II™, Single Ship AGPS Solution (2 pages); Jan. 2007.

Marketing Material/Press Release: Broadcom Introduces Advanced Single-Chip GPS Solution for Mobile Applications (3 pages); Oct. 5, 2007.

Marketing Material/White Paper: SnapTrack: A Qualcomm Company - Snap Track's Wireless Assisted GPS™ (A-GPS) Solution Provides the Industry's Best Location System - Location Technologies for GSM, GPRS and WCDMA Networks (Qualcomm CDMA Technologies: Enabling the Future of Communications) (4 pages); 2003.

* cited by examiner

```
┌─────────────────────────────────────┐
│  PROVIDE GENERIC SATPS RECEIVERS    │
│  WITH A PLURALITY OF OUTPUTS TO BE  │
│  UTILIZED BY A PLURALITY OF         │
│  PARTICULAR SATPS RECEIVER          │
│  APPLICATIONS.                      │
│            310                      │
└─────────────────────────────────────┘
                  │
                  ▼
┌─────────────────────────────────────┐
│   DETERMINE WHICH ONES OF THE       │
│   PLURALITY OF OUTPUTS ARE          │
│            OPERABLE.                │
│              320                    │
└─────────────────────────────────────┘
                  │
                  ▼
┌─────────────────────────────────────┐
│   CLASSIFY THE GENERIC SATPS        │
│  RECEIVERS INTO GROUPS BASED ON     │
│  WHICH ONES OF THE PLURALITY OF     │
│     OUTPUTS ARE OPERABLE.           │
│              330                    │
└─────────────────────────────────────┘
```

FIG. 5

CONFIGURABLE SATELLITE POSITIONING SYSTEM RECEIVERS WITH PROGRAMMABLE INPUTS

CROSS REFERECES TO RELATED APPLICATIONS

This application is a national stage application filed under 35 U.S.C. 371 of International Application PCT/US03/19363, filed Jun. 18, 2003, which claimed priority of U.S. patent application Ser. No. 10/177,128 filed Jun. 20, 2002 and U.S. patent application Ser. No. 10,177,982 filed Jun. 20, 2002, both incorporated by reference into this application.

BACKGROUND OF THE INVENTION

1. Field of the Invention

The present invention relates in general to Satellite Positioning System (SATPS) systems and in particular to generic Satellite Positioning System (SATPS) receivers and related methods.

2. Description of the Related Art

Use of wireless communicators such as cellular telephones, Personal Communication System (PCS) devices, and Personal Data Assistant (PDA) devices, has become commonplace. Such devices can provide voice, data, and other services, such as internet access, affording many conveniences to cellular system users.

The cellular and PCS arenas have recently integrated Satellite Positioning System (SATPS) technology, including Global Positioning System (GPS) technology, into wireless transceiver devices such as the cellular telephone. For example, U.S. Pat. No. 5,874,914, issued to Krasner, which is incorporated by reference herein, describes a conventional method wherein the basestation (also known as the Mobile Telephone Switching Office (MTSO)) transmits GPS satellite information, including Doppler information, to a remote unit using a cellular data link, and then computes pseudoranges to the in-view satellites without receiving or using satellite ephemeris information.

This current interest in integrating GPS with cellular telephony stems from a recent Federal Communications Commission (FCC) regulations requiring that cellular telephones be locatable within 20 feet when an emergency call, such as a "911" call (also referred to as Enhanced 911 or "E911"), is placed by a given cellular telephone. Such position data can assist police, paramedics, and other law enforcement and public service personnel, as well as other agencies seeking to determine the position of a particular wireless communicator such as a cellular telephone.

GPS data that is supplied by the MFSO in the Krasner system can be used by the cellular user for other purposes. For example, the GPS data may be used by to determine information such as directions, particular locations that the cellular user is trying to locate, relative location of the cellular user to other landmarks, directions for the cellular user via internet maps or other GPS mapping techniques, not to mention other purposes. Thus, this data can be very useful to cellular and PCB subscribers because such data can be utilized for purposes other than E911 calls.

In Krasner's methodology, the number of data links that can be connected to a GPS-dedicated data supply warehouse can be limited. Such a server/GPS data supply location, whether at the MTSO or other locations in the cellular network, can require that the cellular telephone maintain two data links. One data link is needed for voice and/or cellular subscriber data used by the cellular subscriber to transmit and receive voice and/or data that the cellular subscriber is using, e.g., talking with another person, sending data across the cellular network, etc. In addition, another data is needed for the GPS information that is being sent by the MTSO/cellular network server to the cellular subscriber.

Conventional cellular telephones are not capable of operating in such a manner. Conventional cellular telephones would therefore either be required to (1) maintain two voice/data links simultaneously, and/or (2) switch between two data links in time. One link would be used to transmit their voice and/or data during cellular use, and another link would be used for the GPS data link This can result in higher charges for the cellular subscriber, as well as overloading cellular system bandwidth.

In digital cellular systems, it is possible for a single data link to support both voice and GPS data communications simultaneously, but there is a cost in terms of available link data rate for voice. In CDMA systems, for example, the additional burden of the GPS data link will increase the total data transmission requirement, and therefore decrease the available range for voice communications at a fixed bit error rate. As a result, GPS equipped telephones that are deployed in a cellular system described by Krasner, would use more bandwidth as the present cellular system. This can be problematic especially since the available bandwidth is overloaded. Alternatively, additional cells could be installed in a Krasner-based system, but this would most likely increase the capital outlay for the cellular telephone network.

Further, in Krasner the location of the "basestation" is required to be within 150 km of the cellular subscriber at the time the cellular subscriber is using the wireless handset. When a cellular subscriber is roaming outside of the home service area, or the MTSO is located at a centralized site for a large cellular network, such as AT&T and Verizon Wireless, the Krasner system would require additional MTSO sites throughout such networks. This can make the networks more costly and less efficient. As such, the FCC mandate for E 911 calls would be difficult if not impossible to achieve using conventional systems such as the Krasner system.

SATPS receivers used in SATPS systems typically need an unobstructed view, or, at least a mostly unobstructed view, of the sky to, receive the SATPS signals. However, wireless communications devices such as cellular telephones, FDA's and PCB devices, are commonly used in situations where the view of the sky is occluded, for example, by large buildings in urban areas (also known as urban canyons). This can make position determination difficult for SATPS receivers. These situations make delivery of consistent, accurate position information difficult. Many solutions have been proposed, such as pseudolite deployment, but such solutions are typically expensive and based on the SATPS infrastructure itself. Consequently, institutions such as local businesses and local governments cannot affect the delivery of more accurate position information.

Using SATPS data for other purposes, such as for location services, is also becoming more commonplace in other types of environments, such as Personal Data Assistants (PDAs). Using SATPS data with other types of wireless networks such as local wireless networks (such as Bluetooth), Short Message Service (SMS), Citizens Band (CB) radio, automotive navigation systems, and other devices is also being contemplated.

However, the requirements of a SATPS receiver for each of these environments are quite different. For example, in a hand-held device, battery power conservation is more important than in an automotive application. Further, some SATPS assistance data may be available in one application that is not available in another. For example, almanac and ephemeris information may be available in a cellular or wireless environment, but may not be available in, for example, an automotive environment.

Conventional SATPS receivers have been designed for a specific application, and depending upon the particular SATPS receiver application many of the outputs and inputs may not be available. In some cases, many of the outputs and inputs are simply disabled, or are otherwise removed from the SATPS receiver due to, for example, design constraints and/or lack of external access to the SATPS receiver. In other cases, many of the outputs and inputs are simply not designed as part of the SATPS receiver.

As such, SATPS receivers useable in one environment may not be useable in another. Conventional SATPS receivers may also present problems when called upon to deliver different types of outputs that are not typically used in conjunction with the particular application for which they are designed. This can make the design and manufacture of SATPS receivers more expensive and more time consuming.

Accordingly, there is a need in the art for improved SATPS receivers that can potentially be implemented in more than one environment and/or application. It would be highly desirable to provide SATPS receivers that can provide different types of outputs so that the SATPS receivers can be utilized by different applications and/or different operating environments. It is also highly desirable to accomplish both of these objectives without substantially increasing the cost and/or complexity of the SATPS receivers.

SUMMARY

An aspect of the present invention provides a method for configuring a generic SATPS receiver that includes a plurality of outputs. Selected ones of the plurality of outputs are enabled/disabled to configure the generic SATPS receiver to function as a SATPS receiver used for a particular SATPS receiver application. The selected ones of the plurality of outputs can be defined by and can be those utilized by the particular SATPS receiver application.

An aspect of the present invention provides another method for configuring a generic SATPS receiver, that includes a plurality of possible outputs, for use in any of a plurality of SATPS receiver applications. At least one input path to the receiver is provided. A plurality of possible outputs is generated. Desired outputs utilized by a particular receiver application are activated/deactivated. The desired outputs are selected from the plurality of possible outputs.

Another aspect of the present invention provides a method for producing a SATPS receiver for a particular application. Generic SATPS receivers are provided that have a plurality of outputs to be utilized by a plurality of particular SATPS receiver applications. A determination is then made as to which ones of the plurality of outputs are operable. Thereafter, the generic SATPS receivers can be grouped based on which ones of the plurality of outputs are operable. Selected ones of the plurality of outputs can then be enabled to configure the generic SATPS receiver to function as a SATPS receiver used for a particular SATPS receiver application.

Another aspect of the present invention provides a configurable SATPS receiver adapted to be utilized in at least one of a plurality of particular SATPS receiver applications. The configurable SATPS receiver includes a plurality of input paths, a plurality of possible outputs, and a means for generating selected ones of the plurality of possible outputs. The selected ones of the plurality of possible outputs comprise outputs that are utilized by at least one particular SATPS receiver application.

Yet another aspect of the present invention provides a generic SATPS receiver adapted to be programmed for use in selected ones of a plurality of SATPS applications. The generic SATPS receiver includes a plurality of SATPS input paths, and a plurality of possible outputs. The plurality of possible outputs can be activated based on a particular SATPS application.

Another aspect of the present invention provides a generic SATPS receiver adapted to be configured for use in any of a plurality of particular SATPS receiver applications. The generic SATPS receiver includes a plurality of input paths and a plurality of possible outputs that can be enabled/disabled based on at least one requirement of a particular SATPS receiver application.

Yet another aspect of the present invention is a generic SATPS receiver adapted to be configured for use in any of a plurality of operating environments. The generic SATPS receiver includes a plurality of programmable outputs, and means for generating desired outputs selected from the plurality of programmable outputs such that the generic SATPS receiver is configured to be utilized in a particular operating environment.

Still another aspect of the present invention is a generic SATPS receiver adapted to be configured for use in any of a plurality of operating environments. The generic SATPS receiver includes a plurality of programmable outputs that can be enabled/disabled based on a particular operating environment. The generic SATPS receiver includes a radio frequency (RF) unit that generates intermediate frequency (IF) outputs based on RF inputs, and a baseband unit that extracts data from selected ones of the intermediate frequency (IF) outputs and assistance data-type inputs. The baseband unit generates desired outputs utilized by the particular operating environment The desired outputs are selected from the plurality of programmable outputs.

Still another aspect of the present invention is a SATPS system that includes at least one satellite that provides SATPS information, a generic receiver, and a remote computer. The generic receiver is to be used in a plurality of receiver applications. The generic receiver is adapted to generate desired ones of a plurality of possible outputs utilized for a particular receiver application.

BRIEF DESCRIPTION OF DRAWINGS

The following discussion may be best understood with reference to the various views of the drawings, described in summary below, which form a part of this disclosure.

FIG. 5 is a flowchart illustrating exemplary operations for producing SATPS receivers according to other embodiments of the present invention.

DETAILED DESCRIPTION OF THE PREFERRED EMBODIMENTS

Figure 1:
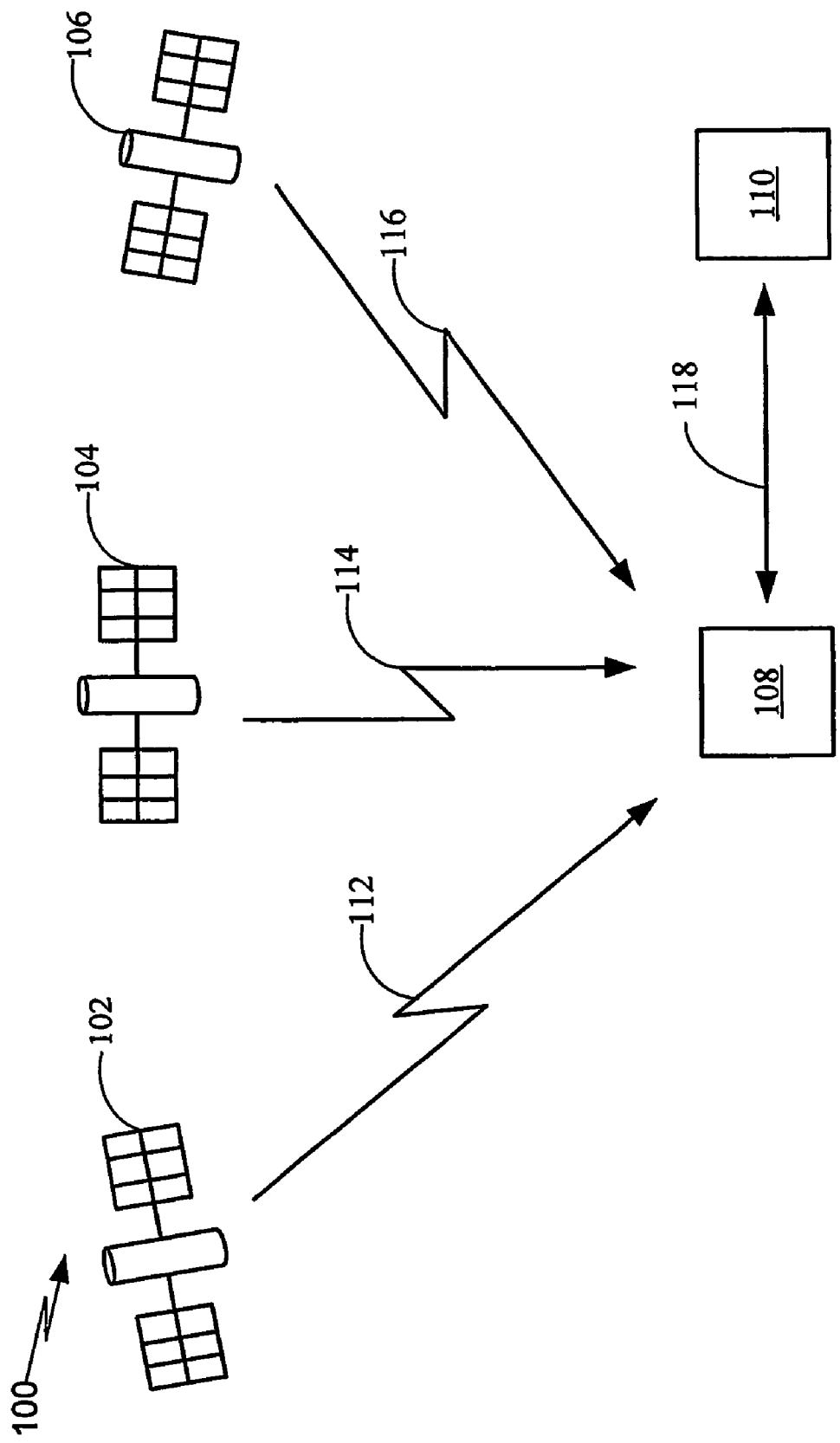
FIG. 1 illustrates a typical SATPS receiver receiving signals from SATPS satellites.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

It will be understood that when an element is referred to as being "connected to" another element, it can be directly connected to the other element or intervening elements may also be present. In contrast, when an element is referred to as being "directly connected to" another element, there are no intervening elements present. The term "adapted to" should be construed to mean "capable of."

Receivers described and illustrated herein may be described as being adapted to generate desired ones of a plurality of possible outputs utilized for a particular receiver application. However, one of ordinary skill in the art will appreciate that each of the receivers described and illustrated herein could be adapted to suppress other ones of the plurality of possible outputs that are not utilized for a particular receiver application.

As used herein, the term "activate/deactivate" can means to switch or toggle between an activated state or a deactivated state, or vice-versa. Similarly, the term "activate/deactivate" could also mean to switch between enabled/disabled states, or vice-versa. For purposes of this description, the terms "activate" and "deactivate" can be used interchangeably, and the terms "enable" and "disable" can also be used interchangably. For example, when the description refers to "activating or enabling desired outputs utilized by a particular receiver application," one of ordinary skill in the art will appreciate that this could also refer to the complementary acts of deactivating or disabling desired outputs utilized by the particular receiver application, and vice-versa. Similarly, when the description refers to "enabling or activating selected ones of the plurality of outputs," one of ordinary skill in the art will appreciate that this could also refer to the complementary acts of "disabling or deactivating selected ones of the plurality of outputs," and vice-versa.

Particularly preferred embodiments of the present invention provide generic SATPS receivers and methods for configuring generic SATPS receivers that include a plurality of outputs are provided. These configurable SATPS receivers are adapted to be utilized in at least one of a plurality of particular SATPS receiver applications, and can also include a plurality of input paths, and a means for generating selected ones of the plurality of possible outputs. The input paths and outputs can be enabled/disabled based on requirements of a particular SATPS receiver application. Selected ones of the plurality of outputs are enabled/disabled based on at least one requirement of the particular receiver application to configure or program the generic SATPS receiver to function as a SATPS receiver used for a particular SATPS receiver application or operating environment. The selected ones of the plurality of outputs can be defined by and can be those utilized by the particular SATPS receiver application or operating environment. The SATPS receiver can be implemented in SATPS systems that include at least one satellite that provides SATPS information, a generic SATPS receiver, and a remote computer.

The particular SATPS receiver applications can include, for example, at least one of a cellular telephone operating environment, an automobile operating environment, and a Personal Data Assistant (PDA) operating environment, a wireless communicator application, a laptop computer application, a location services application, a cellular telephone application, and a vehicle navigation application.

Preferably, the configurable SATPS receiver can include a plurality of input paths responsive to a plurality of possible RF inputs. In some embodiments the input paths may comprise, for example, a first antenna adapted to receive RF inputs and supply the RF inputs to the RF unit, and a second antenna adapted to selectively receive other RF signals based on the particular application. The plurality of RF inputs can be selected from at least one of a group comprising: a frequency reference input, an automatic gain control input, a blanking input, and a jammer-to-noise (J/N) switch. Additionally, according to some embodiments, the other RF signals can be selected from, for example, at least one of a group comprising: cellular system signals, local area network signals, Bluetooth signals, SMS signals, Wide Area Augmentation System (WAAS) signals, beacon signals, and equivalents thereof.

In some embodiments of the present invention, the means for generating can comprise a radio frequency (RF) unit and a baseband unit. The RF unit is responsive to at least one RF input. In many instances, the radio frequency unit can generate a plurality of intermediate frequency (IF) outputs based on the RF inputs. These intermediate frequency (IF) outputs are fed directly into the baseband unit for processing, can be sent directly to a remote location for processing, or can be directly utilized for parallel processing by a remote location and the basedband unit. The intermediate frequency (IF) outputs can be selected from at least one of a group comprising: in-phase (I) output, quadrature-phase (Q) output, I2+Q2 output, oscillator output, Intermediate Frequency (IF) output, an automatic gain control output, and equivalents thereof.

It will be appreciated that IF frequencies, while generally lower than the input RF frequency, are not necessarily so limited. One or more of the IF outputs corresponding to one of the RF inputs may be at a higher frequency than the input RF frequency. This is an unlikely choice for the SATPS RF input, but may be a good choice for another RF input of lower frequency.

The baseband unit is responsive to selected ones of the intermediate frequency (IF) outputs, and can generate selected ones of the plurality of possible outputs utilized by the particular SATPS receiver application. The baseband unit can extract data from selected ones of the RF outputs and other inputs. The baseband unit can generate selected ones of the plurality of the possible outputs from the plurality of possible outputs via software, hardware, firmware and/or combinations thereof. The baseband unit can generate selected ones of the plurality of possible outputs based on the plurality of inputs. In many instances, the plurality of possible outputs may comprise a plurality of programmable outputs that can be enabled/disabled based on the particular receiver application that can be determined based on current operating environment and/or user preferences. According to some embodiments, the plurality of possible outputs can be selected from at least one of a group comprising: a doppler output, a pre-processed information output, a delta pseudorange output, an integrated carrier phase output, a pseudorange output, a time output, a velocity output, a position output, and equivalents thereof.

The baseband unit can further comprise input paths for signals other than the RF inputs from the RF unit, where at least one of the plurality of possible outputs is selected from the plurality of possible outputs and other inputs, based in part on use of signals other than the RF inputs. In many instances, the signals can comprise, for example, a plurality of assistance data-type inputs. Additionally, according to some embodiments, the assistance data-type inputs can be selected from at least one of a group comprising a coarse position input, a navigation data input, a doppler input, a time input, a frequency reference input, a universal time code (UTC) correction input, a ionospheric correction input, an ephemeris input, an almanac input, and/or a satellite ill input, and equivalents thereof.

In one particular embodiment, the generic SATPS receiver is configurable for use with a Global Positioning System (GPS) satellite network. In some embodiments, the baseband unit can extract GPS data from the selected ones of the intermediate frequency (IF) outputs and can generate an output relating to the position of the SATPS receiver.

Practice of preferred aspects of the present invention provide methods and apparatuses for providing SATPS receivers that can be used in multiple applications. Preferred implementations provide SATPS receivers that can accept multiple types of assistance data are also provided. Practice of preferred aspects of the present invention can also provide SATPS receiver having multiple types of outputs depending on the application and/or desires of the user.

Now, further discussion of preferred aspects of a SATPS system using a generic SATPS receiver is provided with reference to the accompanying drawings.

1. System Overview

FIG. 1 illustrates a conventional SATPS system 100 including a SATPS receiver 108 for receiving signals from SATPS satellites 102, 104, 106, and remote computer 110. SATPS satellites 102, 104, 106 send, for example, spread-spectrum signals 112, 114, 116 respectively, that are received by SATPS receiver 108. Other known signals could also be utilized. As used herein, spread spectrum signals refer to a form of wireless communications in which the frequency of the transmitted signal is deliberately varied to result in a much greater bandwidth than the signal would have if it were not varied. SATPS receiver 108 processes these spread-spectrum signals 112, 114, 116. Depending on the application, the SATPS receiver 108 can, for example, determine the location of SATPS receiver 108. The SATPS receiver 108 can process the signals with or without assistance from other inputs. Thus, if needed or desired, the SATPS receiver 108 can receive outside help from remote computer 110, via links 118, to help SATPS receiver 108 determine its location. The links 118 can be wireless and/or other known links such as Universal Serial Bus (USB), IEEE 1394 (also known as firewire), CAN, microwire, and ethernet. Further, SATPS can send information to remote location that includes a remote computer 110 via link 118 to allow remote computer 110 to process information and to determine, for example, the location of SATPS receiver 108. SATPS systems 110 in accordance with FIG. 1 are described in further detail in U.S. Pat. No. 4,445,118, issued to Taylor et al. that is incorporated by reference herein.

2. Receiver

Figure 2:
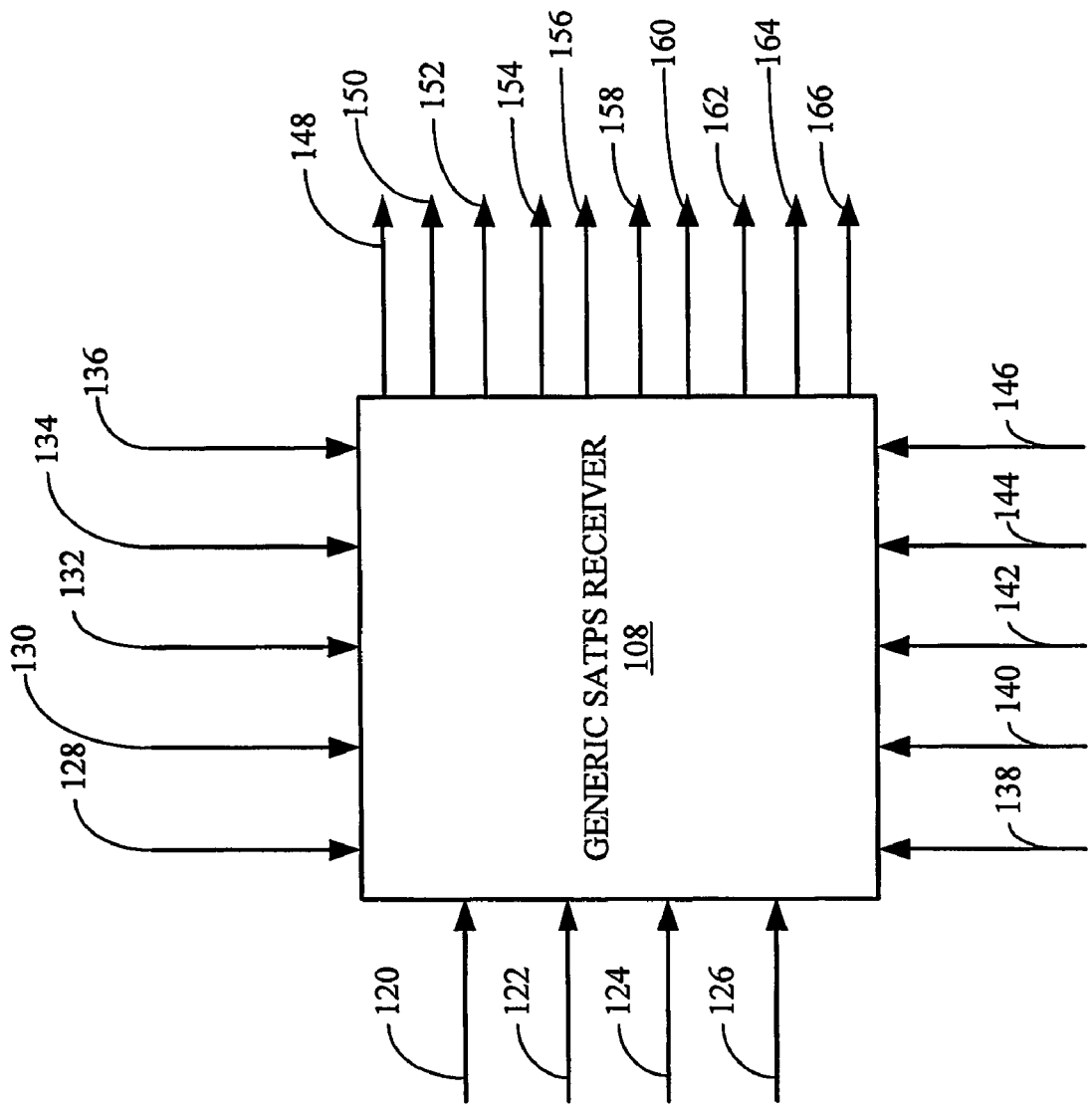
FIG. 2 illustrates a generic SATPS receiver in accordance with embodiments of the present invention.

Referring now to FIG. 2, shown is a generic SATPS receiver 108 in accordance with embodiments of the present invention. The generic SATPS receiver 108 includes a plurality of input paths 120-146, a plurality of possible outputs 148-166, and a generating unit. The generating unit generates desired outputs selected from a plurality of programmable outputs 148-166 such that the generic SATPS receiver 108 can be utilized in any of a number SATPS receiver applications and/or operating environments such as wireless communicator operating environments or applications including a cellular telephone applications and/or laptop computer applications, Personal Data Assistant (PDA) operating environments including location services applications, and automobile operating environments such as a vehicle navigation applications.

The generic SATPS receiver 108 is adapted to be utilized in at least one or a plurality of particular SATPS receiver 108 applications. Selected ones of the plurality of possible outputs 148-166 of the receiver are programmable and can be activated/deactivated to provide outputs 148-166 that are utilized by at least one particular SATPS receiver 108 application. Anyone of the plurality of possible outputs 148-166 can be generated by enabling/disabling selected ones of the plurality of possible outputs 148-166 based on the requirements of a particular application for the receiver. The particular SATPS receiver 108 application generally defines the particular outputs needed for each SATPS receiver application. For example, the plurality of outputs 148-166 can be enabled/disabled to configure the generic SATPS receiver 108 to function as a SATPS receiver 108 used GPS receiver application. Accordingly, the generic SATPS receiver 108 is configurable, and can be configured for use in any of a plurality of particular SATPS receiver 108 applications.

The generic SATPS receiver 108 can be implemented in, for example, a SATPS system that includes satellites 102, 104, 106 that provide SATPS information, and a remote computer 110 that communicates with the SATPS receiver 108 over a link 118. The remote computer 110 could be, for example, a 10 base station, a LAN, a WAN, a server, or other equivalent remote computer. The generic receiver 108 can generate particular ones of the possible outputs 148-166 which can allow for the generic receiver 108 to be used in anyone of the receiver applications mentioned above.

Figure 3:
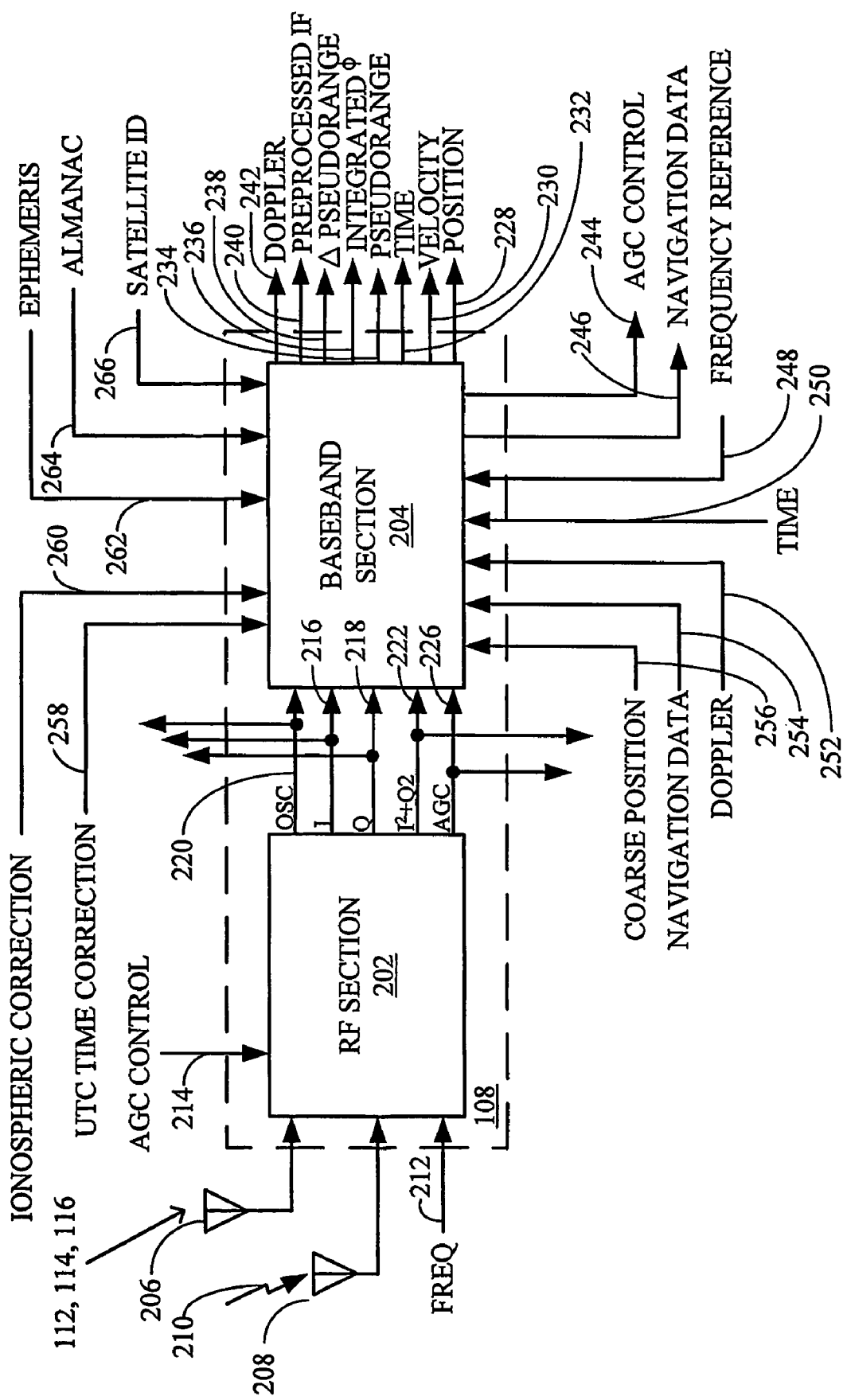
FIG. 3 illustrates a generic SATPS receiver in accordance with other embodiments of the present invention.

Now, further discussion of preferred aspects of other embodiments of a generic SATPS receiver will be provided with reference to FIG. 3.

3. RF Section

FIG. 3 illustrates a SATPS receiver 108 in accordance with other embodiments of the present invention that comprises a Radio Frequency (RF) section 202 and a baseband section 204. The RF section 202 typically accepts RF inputs such as SATPS/GPS signals. The RF section 202 can convert these RF inputs to an intermediate frequency to allow for processing by the baseband section 204 or other processors such as a remote computer 110. As shown in FIG. 3, antenna 206 serves as an input path that is adapted to receive SATPSIGPS signals 112, 114, 116 and supply these SATPS/GPS signals 112, 114, 116 as inputs to RF section 202. Antenna 208 also serves as an input path that is adapted to accept other RF signals 210. These other RF signals 210 can include, for example, cellular system signals, local area network signals, Bluetooth signals, Short Message Service signals carried in the cellular data channel over a cellular RF link, Wide Area Augmentation System (WAAS) signals, beacon signals, or other known signals that can be input to the RF section 202 of a SATPS receiver 108.

RF section 202 can also accept other types of inputs, such as a frequency reference input 212, an Automatic Gain Control (AGC) control input 214, and a blanking input, depending on the requirements or design constraints of the SATPS receiver 108. A frequency reference input 212 may be used to provide precise frequencies to the RF section 202. Providing these precise frequencies can allow for the location of the SATPS receiver 108 to be more precisely determined.

RF section 202 typically also has a number of down converted outputs, such as In-phase (I) output 216, a Quadrature-phase (Q) output 218, an oscillator output 220, an I2+Q2 output 222, an Intermediate Frequency (IF) output 224, and an AGC output 226. Although these outputs can be fed directly into the baseband section 204, these outputs can be taken directly out of the RF section 202 for other purposes such as sending the output information to a remote location 110. These outputs 216-226 can thus be used in processing other than the processing that takes place in the baseband section 204. Alternatively, the outputs 216-226 can also be used in other processing that takes place in parallel with the processing that takes place in the baseband section 204.

4. Baseband Section

Baseband section 204 can accept any of the downconverted outputs 216-226 from the RF section 202. In one application, intermediate frequency (IF) inputs such as the In-phase (I) input 216 and the Quadrature-phase (Q) input 218 are utilized. The I and Q outputs are both oscillating at the intermediate frequency. In addition, the oscillator input 220, the $I^2+Q^2$ input 222, and the AGC input 226, can be utilized by the baseband section 204 to compute, for example, a position of the SATPS receiver 108, and output that position as position output 228.

However, depending upon the particular application of the SATPS receiver 108, other inputs to and outputs from baseband section 204 are also possible. For example, some of the possible outputs of baseband section 204 can include velocity 230; time 232, pseudorange 234, integrated carrier phase 236, delta pseudorange 238, pre-processed IF information 240, Doppler 242, AGC control 244, and navigation data 246. Other assistance data-type inputs to the baseband section 204 can include, for example, a frequency reference 248, time 250, Doppler 252, navigation data 254, coarse position 256, Universal Time Code (UTC) time correction 258, ionospheric correction 260, ephemeris 262, almanac 264, and satellite ID 266. Combinations of the various inputs to the baseband section and outputs from the baseband section are possible. Other inputs and other outputs are also possible without departing from the scope of the present invention.

This generic SATPS receiver 108 includes all of the possible outputs 228-246 and all of the inputs 216-222 and 226, 248-266 utilized in SATPS receiver applications. As such, the SATPS receiver 108 can be implemented in all possible SATPS receiver applications that require those outputs. Aspects of the present invention can overcome limitations of the conventional SATPS receivers by providing a generic SATPS receiver that includes a dynamic set of outputs. This dynamic set of outputs is made available to the designer and user of these generic SATPS receivers, both at time of design and at time of implementation, as well throughout the various scenarios of a specific implementation's use. Moreover, yields are increased since a generic SATPS receiver chip that would not be operable in one environment may still be utilized in other environments or applications that do not require those particular outputs to be operable. Some of the particular inputs to and outputs from the baseband section 204 will now be discussed in greater detail.

5. Inputs to the Baseband Section

As noted above, the inputs 216-222 and 226, 248-266 to the baseband section 204 can include, for example, the Intermediate Frequency (IF) inputs such as In-phase (I) input 216 and the Quadrature-phase (Q) input 218. Inputs to the baseband section 204 may also include the oscillator input 220, the $I^2+Q^2$ input 222, and the AGC input 226, a frequency reference 248, time 30 250, Doppler 252, navigation data 254, coarse position 256, Universal Time Code (UTC) correction 258, ionospheric correction 260, ephemeris 262, almanac 264, and satellite ID 266.

Some of these inputs 216-222 and 226 to the baseband section 204 can be used to provide baseband section with GPS signals 112-116 that have been downconverted such that baseband section 204 can process the signals and can extract GPS data from GPS signals 112-116. Assistance data-type inputs 248-266 to the baseband section 204 can be used to help the baseband section 204 to generate outputs 228-246 of baseband section 204, such as position output 228. Other ones of inputs 248-266 can be used to refine the outputs of baseband section 204 and make those outputs 228-246 more accurate or more timely.

As shown in Table 1 below, the particular inputs to the baseband section 204, listed in the rows, may vary depending on the particular application. The particular inputs that can be implemented in the particular applications, listed in the columns, are indicated with an "x".

TABLE 1

| Inputs/Applications | Cellular | Vehicle Navigation | Laptop Computer | Surveying | PDA |
|---|---|---|---|---|---|
| In-phase (I) Input 216 | X | X | X | X | X |
| Quadrature-phase (Q) input 218 | X | X | X | X | X |
| Oscillator input 220 | X | X | X | X | X |
| $I^2 + Q^2$ input 222 | | | | | |
| ACG input 226 | X | X | X | X | X |
| a frequency reference 248 | X | | | | |
| time 250 | X | | X | | X |
| Doppler 252 | X | | X | | X |
| navigation data 254 | X | | X | | X |
| coarse position 256 | X | | | | |
| Universal Time Code (UTC) time correction 258 | X | | X | | X |
| ionospheric correction 260 | X | | X | | X |
| ephemeris 262 | X | | X | | X |
| almanac 264 | X | | X | | X |
| satellite ID 266 | X | | X | | X |

Oscillator input 220 is required to clock I and Q samples, and also to maintain time. The $I^2+Q^2$ input 222 can be used to determine the total power in the band, and to control AGC. The IF inputs (including I and Q samples) are utilized by an analog baseband to determine phase and amplitude of the GPS signal. AGC input 226 can be used to detect the presence of jammers when the I and Q samples do not provide a valid estimate of total power. A frequency reference input 248 can be used to remove oscillator dynamics from loop filters in the baseband section 204, which can improve the signal-to-noise ratio, and improve measurement accuracy. The time input 250 along with coarse position 256 and ephemeris input 262 and/or almanac input 264 can be used to reduce the search window. Alternatively, the Doppler input 252 can also be used instead of time input 250, position input 228, and almanac 264/ephemeris 262 to reduce the search window. The pseudorange differential 238 can be used to improve solution accuracy.

6. Outputs from the Baseband Section

Typically, SATPS receiver 108 determines the position of SATPS receiver 108 and outputs that position as position output 228. The position output 228 is used to report the position, typically in longitude and latitude, of the receiver 108.

However, in certain receiver applications, this may not be the desired output or the only desired output of the SATPS receiver 108. For example, the velocity output 230 can be used to determine the speed at which the receiver 108 is traveling. The time output 232 can be used to clock the RF section, or as a clock reference for a timing function of a device the receiver 104 is integrated with. The pseudorange output 234 can be used as a partially processed output where the position is calculated by another microprocessor. The integrated carrier phase output 236 can be used to increase sensitivity and accuracy. The delta pseudorange output 238 can be used to increase sensitivity and accuracy of the position calculation. The pre-processed IF information output 240 can be used when pseudorange is not available. The doppler output 242 can also be used when delta pseudorange is not available. The AGC control output 244 can be used to control the RF section. The navigation data output 246 can be used to assist in the navigation of the receiver 108. The baseband outputs could also include other signal quality indicators 224, such as satellite signal-to-noise and phase error estimates.

As shown in Table 2 below, the particular outputs from the baseband section that are selected may vary depending on the particular application. For example, surveying applications of SATPS receiver 108 typically use the integrated carrier phase 236 to reduce the pseudo range noise to the level of delta psuedorange noise since the effect of multipath on integrated carrier phase 236 is much smaller.

TABLE 2

| Outputs/<br>Applications | Cellular | Vehicle<br>Navigation | Laptop<br>Computer | Surveying | PDA |
|---|---|---|---|---|---|
| position output 228 | X | X | X | | X |
| velocity output 230 | X | X | X | | X |
| time output 232 | X | X | X | | X |
| psuedorange output 234 | X | X | X | | |
| integrated carrier phase output 236 | | X | | X | |
| delta psuedorange output 238 | X | X | X | X | |
| Preprocessed integrated phase output 240 | | | | X | |
| Doppler output 242 | X | | X | | |
| automatic gain control (AGC) output 244 | X | X | X | X | |
| other signal quality indicators 224 | | | | | |

Aspects of the present invention can allow for the dynamic change of a SATPS receiver 108 to allow the SATPS receiver to adapt to its current operating environment. Specific ones of the outputs 228-246 can be used specifically for specific applications, and can be ignored by other applications. In contrast to conventional GPS receivers, aspects of the present invention can provide the designer and user of SATPS receivers with a dynamic set of outputs, at time of design and/or at the time of implementation, as well throughout the various specific implementations of the generic receiver 108. For example, many receivers are designed to perform position calculations only, and do not output, for instance, pseudoranges or other data that can be used by the outside world. The user is unable to tell, for example, which satellites are used to determine position, what pseudoranges were used, or which almanacs were used to determine if the calculation is correct. Further, it may not be possible to help the SATPS receiver 108 with any outside information, such as a visible list for the present time, to help the SATPS receiver 108 to achieve a faster Time To First Fix (TTFF).

Aspects of the present invention can also allow a designer, user, or the SATPS receiver 108 itself, to intelligently adapt to the current operating environment and/or application. For example, if the user knows that the SATPS receiver 108 is attached to a PDA that has a local clock, or frequency reference, such a frequency reference input can be used in the SATPS receiver on the frequency reference input 248 to help the SATPS receiver attain greater accuracy. Coarse position 256, time 250, and other inputs may also be available. These outputs can be manually entered as available by the user, determined by the packaging of the SATPS receiver 108, or determined by the SATPS receiver 108 itself by querying specific software or hardware flags to determine what help or inputs are available, and which outputs are desired or needed. As such, the SATPS receiver 108 can adapt itself, or the adaptation can be performed by the designer or the user as needed or desired.

7. Implementations of the Baseband Unit

It will be understood that the baseband unit 204 shown in the block diagram illustration of FIG. 3 may be implemented, for example, using electronic circuits included in wireless communicators configured to operate in wireless communications systems. It will also be appreciated that the baseband unit 204 shown in the block diagram illustration of FIG. 3, may be implemented in special purpose hardware such as discrete analog and/or digital circuitry, such as combinations of integrated circuits or one or more Application Specific Integrated Circuits (ASICs), as well as by computer program instructions which may be loaded onto a computer or other programmable data processing apparatus to produce a machine such that the instructions which execute on the computer or other programmable data processing apparatus to create means for implementing the functions specified in the blocks. The computer program instructions may also be loaded onto a computer or other programmable data processing apparatus to cause a series of operations to be performed on the computer or other programmable apparatus to produce a computer implemented process such that the instructions which execute on the computer or other programmable apparatus provide operations for implementing the functions specified in the blocks.

Accordingly, blocks of FIG. 3 support electronic circuits and other means for performing the specified functions, as well as combinations of operations for performing the specified functions. It will be understood that the circuits and other means supported by each block of FIG. 3, and combinations of blocks therein, can be implemented by special purpose hardware, software or firmware operating on special or general purpose data processors, or combinations thereof. For example, the baseband unit can generate selected ones of the plurality of the possible outputs from the plurality of possible outputs via special purpose hardware, software or firmware operating on special or general purpose data processors, or combinations thereof.

Aspects of the present invention provide a generic SATPS receiver as discussed above, as well as methods for configuring a generic SATPS receiver 108 for use in any of a plurality of SATPS receiver 108 applications.

Figure 4:
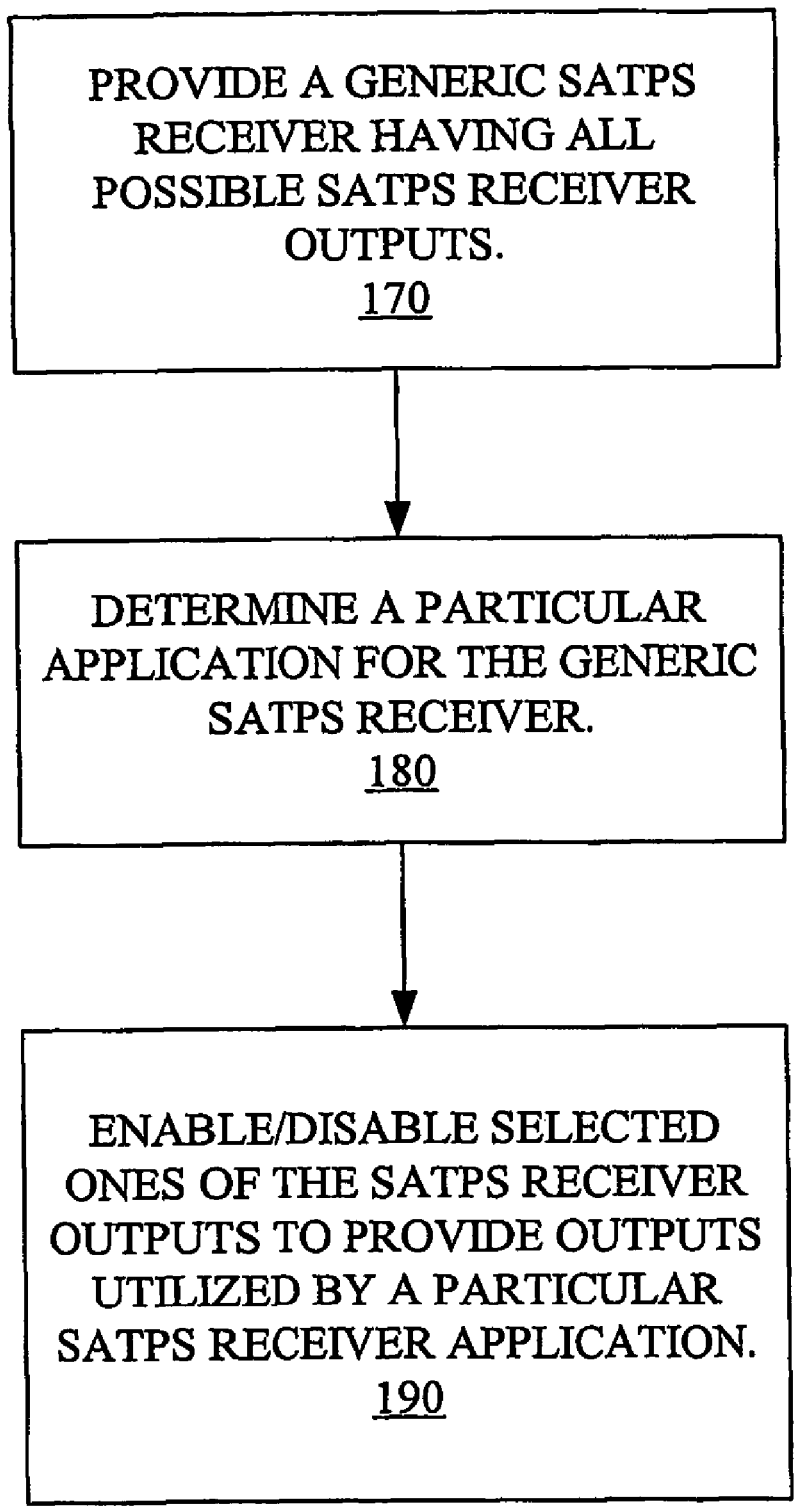
FIG. 4 is a flowchart illustrating exemplary operations for configuring SATPS receivers according to embodiments of the present invention.

Referring now to FIG. 4, shown is one such method. At step 170, a generic SATPS receiver is provided. The SATPS receiver includes input paths for providing data to the receiver. The generic SATPS receiver includes a plurality of possible outputs 130-146 that correspond to all or virtually all of the possible outputs that are utilized in SATPS receiver applications, and is capable of generating all or some of the possible outputs 130-146. At step 180, the user or designer determines which of the plurality of SATPS receiver 108 applications the receiver will be utilized in conjunction with. At step 190, desired utilized by a particular receiver 108 application can be activated/deactivated. The desired outputs 130-146 are can then be enabled/disabled to configure the generic SATPS receiver 108 to function as a SATPS receiver 108 used for a particular SATPS receiver application.

Referring now to FIG. 5, shown is a method for producing a SATPS receiver 108 for a particular application. At step 310, generic SATPS receivers 108, as described above, are provided. These generic SATPS receivers 108 have a plurality of outputs 130-146 that can be utilized by a plurality of particular SATPS receiver 108 applications. At step 320, a determination is then made as to which ones of the plurality of outputs 130-146 are operable. Thereafter, at step 330, the generic SATPS receivers 108 can be grouped based on which ones of the plurality of outputs 130-146 are operable. Because only certain ones of the outputs are utilized in specific applications, it is not necessary that all of the outputs be operable. Even if certain ones of the outputs are not operable, the receiver 108 may still be utilized in certain SATPS receiver applications.

As described above, aspects of the present invention relate to methods and apparatuses for determining which inputs and outputs should be used for given SATPS receivers. These receivers can be pre-programmed to accept certain inputs and provide certain outputs, or can be dynamically programmed or automatically determine which inputs are available based on inputs to the SATPS receiver. These SATPS receivers can then use the available assistance inputs, e.g., Bluetooth signals, Ultra Wide Band (UWB) signals, etc. as an aide to the SATPS signals, or, where SATPS signals are inadequate, as a replacement for the SATPS signals, based on either user-selected or automatically selected criterion. As discussed herein, aspects of the present invention can provide SATPS receivers that can be used in multiple applications, that can accept multiple types of assistance data, and that can provide multiple types of outputs depending on the application and/or desires of the user.

While the present invention has been described in terms of certain preferred embodiments, those of ordinary skill in the will appreciate that certain variations, extensions and modifications may be made without varying from the basic teachings of the present invention. As such, the present invention is not to be limited to the specific preferred embodiments described herein. Rather, the scope of the present invention is to be determined from the claims, which follow.

What is claimed is:

1. A method of adapting a configurable Satellite Positioning System (SATPS) receiver for use in at least one of a plurality of particular SATPS receiver applications, the method comprising:

providing a plurality of input paths to the configurable SATPS receiver responsive to a plurality of possible radio frequency (RF) inputs;

providing a plurality of possible types of SATPS outputs from the configurable SATPS receiver;

determining the at least one particular SATPS receiver application from the plurality of particular SATPS receiver applications based on the plurality of possible RF inputs; and selecting at least one SATPS output from the plurality of possible SATPS outputs responsive to the determination of the at least one particular SATPS receiver application.

2. The method of claim 1, wherein the step of determining the at least one particular SATPS receiver application further includes the step of generating a plurality of intermediate frequency (IF) type of SATPS outputs based on the plurality of possible RF inputs.

3. The method of claim 2, wherein the at least one selected SATPS output is selected from the plurality of possible types of SATPS outputs by a baseband unit responsive to selected ones of the plurality of the IF type of SATPS outputs.

4. The method of claim 3, further including the steps of:

providing input paths to the baseband unit for inputs other than the plurality of possible RF inputs; and selecting the at least one of the plurality of possible types of SATPS outputs from the plurality of possible types of SATPS outputs based in whole or in part on the inputs other than the RF inputs.

5. The method of claim 4, wherein the inputs other than the RF inputs include a plurality of assistance data-type inputs.

6. The method of claim 5, wherein the assistance data-type inputs are selected from at least one of a group consisting of: a coarse position input, a navigation data input, a Doppler input, a time input, a frequency reference input, a universal time code (UTC) correction input, an ionospheric correction input, an ephemeris input, an almanac input, and a satellite ID input.

7. The method of claim 6, further including the steps of:

extracting Global Positioning System (GPS) data from the selected ones of the plurality of the IF type of SATPS outputs; and generating an output relating to the position of the configurable SATPS receiver.

8. The method of claim 1, wherein the plurality of possible RF inputs are selected from at least one of a group consisting of: a frequency reference input, an automatic gain control input, a blanking input, and jammer-to-noise (J/N) switch.

9. The method of claim 2, wherein the IF types of SATPS outputs are selected from at least one of a group consisting of: an in-phase (I) output, a quadrature-phase (Q) output, an $I^2+Q^2$ output, an oscillator output, an Intermediate Frequency (IF) output, an automatic gain control output, and other signal quality indicators.

10. The method of claim 3, wherein the selected ones of the plurality of the IF type of SATPS outputs are fed directly into the baseband unit for processing.

11. The method of claim 3, wherein the selected ones of the plurality of the IF type of SATPS outputs are sent directly to a remote location.

12. The method of claim 3, wherein the selected ones of the plurality of the IF type of SATPS outputs are directly utilized for parallel processing by a remote location and the baseband unit.

13. The method of claim 1, wherein the plurality of possible types of SATPS outputs includes a plurality of programmable outputs that can be enabled based on the at least one particular SATPS receiver application.

14. The method of claim 13, wherein the at least one particular SATPS receiver application is determined based on current operating environment and/or user preferences.

15. The method of claim 1, wherein the plurality of possible types of SATPS outputs are selected from at least at least one of a group consisting of: a Doppler output, a pre-processed information (IF) output, a delta pseudorange output, an integrated carrier phase output, a pseudorange output, a time output, a velocity output, and a position output.

16. The method of claim 1, wherein the plurality of RF input paths includes at least one antenna adapted to receive RF signals inputs and supply the RF signals as RF inputs to an RF unit.

17. The method of claim 16, wherein the at least one antenna is a first antenna adapted to selectively receive other RF signals based on the at least one particular SATPS receiver application.

18. The method of claim 17, wherein the plurality of RF input paths further includes a second antenna adapted to selectively receive the other RF signals inputs based on the at least one particular SATPS receiver application.

19. The method of claim 18, wherein other RF signals are selected from at least one of a group consisting of: cellular system signals, local area network signals, Bluetooth signals, SMS signals, Wide Area Augmentation System (WAAS) signals, and beacon signals.

20. The method of claim 1, wherein the particular SATPS receiver applications include at least one of a cellular telephone operating environment, an automobile operating environment, and a Personal Data Assistant (PDA) operating environment.

* * * * *